United States Patent
Saidi et al.

(10) Patent No.: US 7,395,186 B2
(45) Date of Patent: Jul. 1, 2008

(54) DIAGNOSTIC DEVICE USING ADAPTIVE DIAGNOSTIC MODELS, FOR USE IN A COMMUNICATION NETWORK

(75) Inventors: Mohamed Adel Saidi, Antony (FR); Olivier Martinot, Draveil (FR); Emmanuel Marilly, Saint-Michel-sur-Orge (FR); Sylvain Squedin, Nozay (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/203,976

(22) Filed: Aug. 16, 2005

(65) Prior Publication Data

US 2006/0064283 A1    Mar. 23, 2006

(30) Foreign Application Priority Data

Sep. 8, 2004    (FR) .................................... 04 51983

(51) Int. Cl.
*G06F 11/30* (2006.01)
*G21C 17/00* (2006.01)

(52) U.S. Cl. ..................................................... 702/183
(58) Field of Classification Search ......... 702/182–185, 702/188, 189
See application file for complete search history.

(56) References Cited

U.S. PATENT DOCUMENTS

| 5,428,619 A * | 6/1995 | Schwartz et al. ............ 714/712 |
| 6,076,083 A | 6/2000 | Baker et al. |
| 2006/0064282 A1* | 3/2006 | Marilly et al. .............. 702/183 |

\* cited by examiner

*Primary Examiner*—Michael P Nghiem
(74) *Attorney, Agent, or Firm*—Sughrue Mion, PLLC

(57) ABSTRACT

A communication network includes network equipments coupled to a management system. A diagnostic device for the network determines the causes of problems occurring in the network via one or more diagnostic models and adapts the diagnostic models as a function of data provided by the management system that is representative of the composition of the network.

19 Claims, 2 Drawing Sheets

DIAGNOSTIC DEVICE USING ADAPTIVE DIAGNOSTIC MODELS, FOR USE IN A COMMUNICATION NETWORK

CROSS-REFERENCE TO RELATED APPLICATIONS

This application is based on French Patent Application No. 0451983 filed Aug. 9, 2004, the disclosure of which is hereby incorporated by reference thereto in its entirety, and the priority of which is hereby claimed under 35 U.S.C. §119.

BACKGROUND OF THE INVENTION

1. Field of the Invention

The invention relates to the field of managed communication networks and more particularly diagnostic devices for determining the cause of problems occurring within such networks.

2. Description of the Prior Art

Problems occurring in managed communication networks can have many different causes. The main causes include, for example, power outages, broken connections, breakdowns or malfunctions of network equipments (or the components constituting them), and the integration of a new or old version of a network equipment (or a component constituting it) that is not entirely compatible with the remainder of the network.

In the present context, the expression "network equipment" refers to a combination of hardware and software.

A certain number of diagnostic devices (or tools) have been proposed for determining the causes of problems. Certain of these devices use techniques based on programming in object-oriented languages and/or rules-based languages, possibly managed by a rules engine. This applies in particular to the event correlation expert (ECXpert) device, devices from ILOG that use a programmable rules engine for diagnosis, Network Node Manager® version 6.4 devices, Network Node Manager Extended Topology® version 2.0 devices from Hewlett Packard, the Fault Detective for Data Communications (FDDC)® device from Agilent, and the TAC® device from CISCO.

ALCATEL also offers a diagnostic device based on Bayesian probabilistic theory and used to define rules for refining hypotheses on the basis of concepts of additional evidence and background information, which lead to numbers each representing the probability that a hypothesis is true and used to construct Bayesian networks (also known as Bayesian diagrams) defining test operations associated with statistical or probabilistic weights.

The main drawback of the above diagnostic devices is that they use static diagnostic models, i.e. models whose characteristics are fixed when they are designed and therefore cannot be adapted (or in the best case scenario only very partially adapted) to evolution of the resources of most networks, as much from the point of view of the hardware (or the versions thereof) as from the point of view of the software (or the versions thereof), or to evolution of the traffic in the network. This is a result of the fact that the diagnostic models are constructed from a knowledge base that is based on expert knowledge and that is rarely adapted to all the specific hardware and software and/or to all the combinations of hardware and/or software, and which additionally is at best representative of only what is known in the art at the time it was designed.

U.S. Pat. No. 6,076,083 proposes a solution for adapting diagnostic models, but merely as a function of experience acquired in their use. This solution is therefore unable to take account of the evolution of the managed communication network, and is therefore inadequate.

It is, of course, always possible to design new diagnostic models adapted to each evolution of the network, but this is particularly costly and necessitates a certain design time during which new causes of problems occurring within a network cannot be diagnosed correctly.

The object of the invention is to improve on the situation of there being no prior art diagnostic device that is entirely satisfactory.

SUMMARY OF THE INVENTION

To this end it proposes a diagnostic device for a communication network including network equipments coupled to a management system, said device including diagnostic means adapted to determine the cause of problems occurring in said network by means of one or more diagnostic models and processing means adapted to adapt said diagnostic model as a function of data provided by said management system that is representative of the composition of said network.

The diagnostic device may have additional features and in particular, separately or in combination:

said data is representative of modification of network equipment and said processing means include analysis means adapted to analyze the received data to determine actions to be undertaken to adapt said diagnostic model taking account of the network equipment modification or modifications that they represent and to generate instructions representative of said actions and adaptation means adapted to adapt a diagnostic model as a function of an instruction or instructions received from said analysis means, said processing means include a first memory coupled to said analysis means and adapted to store one or more reference diagnostic models and said analysis means are adapted to determine each adaptation action to be undertaken by comparing data received to one or more reference diagnostic models stored in said first memory, said analysis means are adapted to determine adaptation actions selected from a group including an action representative of a new model to be constructed, an action representative of a modification to be made to an existing diagnostic model, and an action representative of reconfiguration of an existing diagnostic model, the device further comprises a second memory coupled to said processing means and to said diagnostic means and adapted to store each diagnostic model transmitted by said processing means, said adaptation means are adapted, on receiving an instruction requiring the generation of a new diagnostic model because of specific network equipment modifications, to extract from said first memory a reference diagnostic model adapted to the composition of said network taking account of said specific modifications, in order to generate a new diagnostic model and then to store it in said second memory, said adaptation means are adapted, on receiving an instruction requiring the modification of an existing diagnostic model stored in said second memory because of specific network equipment modifications, to extract said existing diagnostic model from said second memory in order to modify it as a function of said specific modifications and then to store it when modified in said second memory, said adaptation means are adapted, on receiving an instruction requiring the reconfiguration of an existing diagnostic model stored in said second memory because of specific network equipment modifications, to extract said existing diagnostic model from said second memory in order to reconfigure it as a function of said specific modifications and then to store it when reconfigured in said second memory, said diagnostic means are adapted, on receiving a request for a selected diagnosis, to extract said selected diagnosis from said second memory and then to execute the extracted diagnostic model in order to deliver a diagnosis at an output, said data is transmitted by said management system in the form of notifications, at least some of said reference diagnostic models take the form of one or more Bayesian networks, at least some of said diagnostic models take the form of one or more Bayesian networks, The invention also provides a network management system or a service management system for a managed communication network, said system comprising one or more diagnostic devices of the kind defined hereinabove.

Other features and advantages of the invention will become apparent on reading the following detailed description and examining the appended drawings.

DETAILED DESCRIPTION OF THE PREFERRED EMBODIMENTS

The appended drawings constitute part of the description of the invention as well as, if necessary, contributing to the definition of the invention.

An object of the invention is to enable the cause of a problem that has occurred in a managed communication network to be determined by means of a diagnostic device including adaptive diagnostic models.

The Invention applies to any type of managed networks including network equipments, and in particular Internet protocol (IP) networks.

In the present context, the expression "network equipment" means a combination of hardware and software, for example core routers and edge routers.

Figure 1:
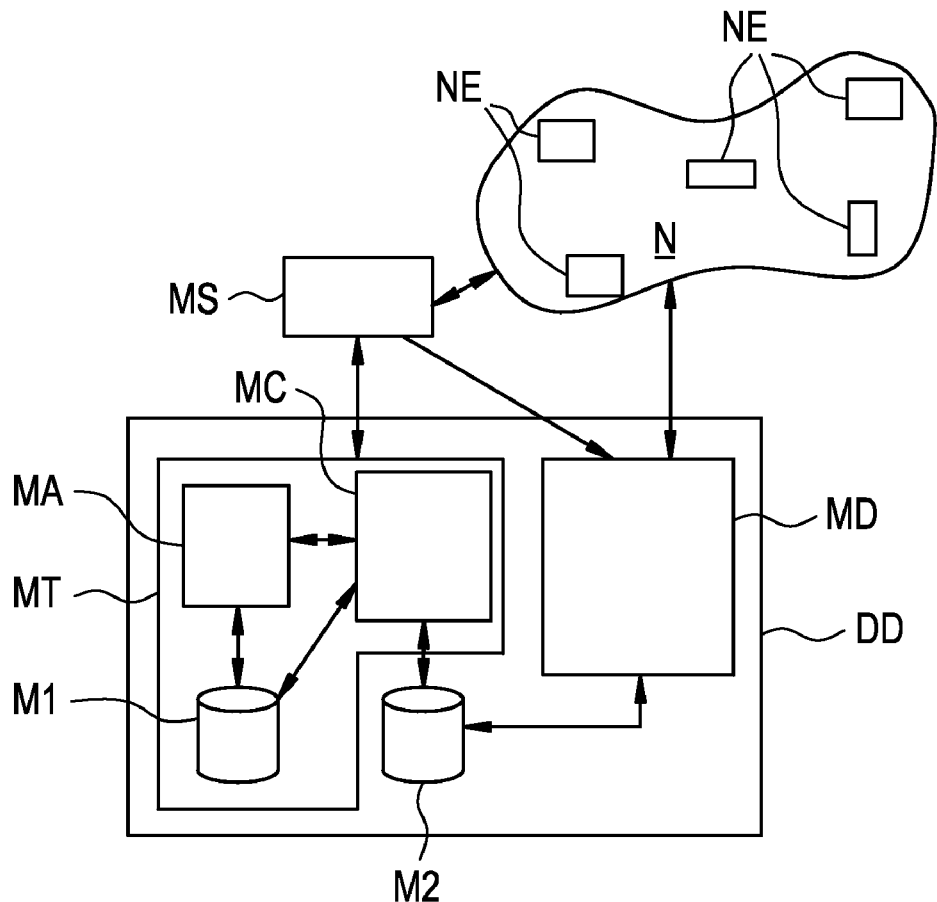
FIG. 1 is a diagram of one embodiment of a diagnostic device of the invention coupled to a network management system.

A diagnostic device DD of the invention is described first with reference to FIG. 1.

In the embodiment shown, the diagnostic device DD is coupled to a management system MS of a managed communication network N. To this end it may take the form of a dedicated card or module adapted to be connected to the management system MS, where applicable via a connection interface.

Figure 3:
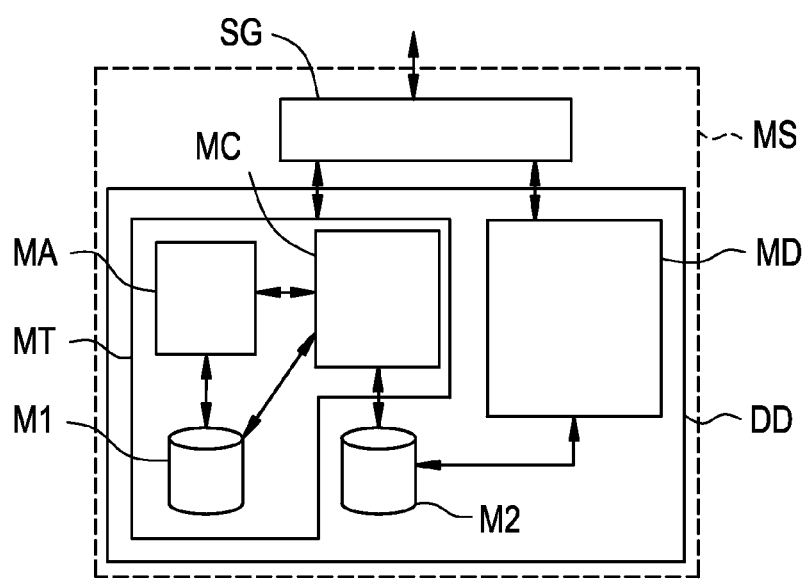
FIG. 3 is a diagram of one embodiment of a network management system comprising a diagnostic device of the invention.

However, in the variant shown in FIG. 3, the diagnostic device DD forms part of the management system MS. In this case, the processing module MT of the diagnostic device DD is coupled to a management server SG of the management system MS.

The management system MS to which the diagnostic device DD is coupled may be a network management system (NMS) or a service management system of the network N (when it is required to diagnose a service). It is considered hereinafter, by way of non-limiting example, that the management system MS to which the diagnostic device DD is coupled is a network management system (NMS).

Moreover, the diagnosis may relate equally to the network level (network equipments and configuration) and to the management and service level (network equipments, configuration, quality of service (QoS) and service level agreements (SLA)).

The diagnostic device DD firstly comprises a diagnostic module MD for determining causes of problems by means of one or more diagnostic models.

Each time that it is requested to effect a diagnosis designated in a request, the diagnostic module MD activates (or uses or executes) the diagnostic model that corresponds to the designated diagnosis in order to deliver at an output a diagnosis, i.e. at least the cause or causes of a problem that has occurred within the network N.

The diagnostic models are stored in a memory M2 of the diagnostic device DD, for example, taking the form of a database which the diagnostic module MD can access to select one of the models following reception of a diagnosis request, for example.

The sending of a diagnosis request to the diagnostic device DD is generally requested by a network operator following reception by the network management system MS of one or more notifications from network equipments NE.

The diagnosis request may be either generated by the management system MS or transmitted directly to the diagnostic device DD without passing through the management system MS.

For example, these notifications are alarms that the network equipments NE transmit automatically to the network management system MS if they detect a problem (breakdown or malfunction) within themselves (i.e. at the level of one of their components, for example an input or output interface) or on one of their connections.

Because these notifications do not always contain sufficient information, complementary information may be requested of the network equipments concerned by the network management system MS, generally at the request of the network operator. This complementary information can be management information and/or information on the functioning of certain network equipments NE, for example, which are generally stored in their management information base (MIB).

This information can equally be measurements relating to network parameters, for example the bandwidth used on certain connections or by certain calls (traffic analysis) or the packet loss rates on certain connections or in certain calls, which in particular enable network operators to monitor and manage the quality of service (QoS) that is associated with each user client or service and is defined by a service level agreement (SLA).

The invention relates to any type of diagnostic model, regardless of the network equipments NE concerned (whether pure components (hardware), pure software or combinations thereof.

The diagnostic module MD is adapted as a function of the diagnostic model(s) that it uses. It is therefore designed to execute the scenario of a reference diagnostic model and uses a database, SNMP tools and the like, for example, and delivers to an output results constituting diagnoses.

The diagnostic device DD of the invention also includes a processing module MT coupled to the network management system MS and responsible for adapting the diagnostic models, which are stored in the memory M2, for example, as a function of data representative of the composition of the network N supplied by the network management system MS.

For the purpose of adapting the diagnostic models, the processing module MT includes an analysis module MA and an adaptation module MC that are coupled to each other, for example, as shown in FIG. 1.

The analysis module MA is more specifically responsible for analyzing data that comes from the network management system MS in order to determine the actions that must be undertaken to adapt the diagnostic model stored in the memory M2, or one of these models, or to generate a new diagnostic model.

Each action is determined as a function of information contained in the data received and in any complementary data requested.

For example, the data is transmitted by the management system MS to the processing module MT in the form of notifications of modification of network equipment(s) NE (hardware and/or software).

This transmission can be effected automatically, periodically, or each time that the management system MS receives information representative of a modification in the network N. Alternatively, it may be envisaged that the analysis module MA is configured to observe data in the management system MS representative of modifications in the network N. It may equally be envisaged that the analysis module MA be configured to request the management system MS to send it data representative of modification(s) in the network N since the preceding request, for example periodically.

At least three types of action may be envisaged. A first type concerns generating a new diagnostic model to be constructed. A second type concerns modifying an existing diagnostic model. A third type concerns reconfiguring an existing diagnostic model.

If the data received from the management system MS is insufficient for determining the action to be undertaken, the analysis module MA may request complementary information (complementary data) from the management system MS.

The analysis module MA is also responsible for generating instructions representative of actions that it has determined following the reception of data and which are intended for the adaptation module MC.

An instruction defines one or more actions to be undertaken and comprises information representative of modification(s) reported by the management system MS.

For example, to determine each action to be undertaken, the analysis module MA can compare the data that it receives to one or more reference (or basic) diagnostic models that are stored in a memory M1 of the processing module MT. This memory M1 takes the form of a database, for example.

The reference diagnostic models may be of different types. They can in particular take the form of rules and/or models or a Bayesian network (also known as a causal diagram). Any diagnostic model generation technique may be envisaged, and in particular the CodeBook technique, the neural network technique or the Petri network technique.

A Bayesian network is a causality tree consisting of branches associated with complementary probabilities and comprising nodes designating basic (or elementary) tests to be effected and from which there may depart one or more sub-branches also associated with one or more probabilities and having nodes designating other basic (or elementary) tests to be effected and from which there may depart one or more sub-branches.

In other words, a Bayesian network is a scenario for finding the root cause of a specific problem, for example the loss of packets in an IP VPN, by executing different tests according to the probabilities in question, so as to send back the cause of the problem and where applicable complementary information (for example the number of packets lost) if such information can be determined.

Additional information on Bayesian networks and their use in diagnostic devices can be found in F. Jensen, "An introduction to Bayesian Networks", UCL Press., 1996 (republished 2001).

Each reference diagnostic model is adapted to determine at least one cause of an inventoried problem. For example, a reference diagnostic model may be dedicated to diagnosing packet loss in an IP router.

Each reference diagnostic model may include tests and requests for active or passive measurements, requests for configuration verification, for verification of the consistency of the configuration of a service via the network, or to read parameters stored in management information bases (MIB) or available in certain network equipments such as routers and specific to an equipment.

The reference diagnostic models may be generated by any means, and in particular from a knowledge base that is based on expert knowledge and comprises data (or information) coming from one or more sources, for example the design of the equipment (specifications, configurations, validation and the like, and problems and/or weaknesses encountered), the fabrication of the equipment (components used, technologies used and the like, and problems and/or weaknesses encountered), laboratory equipment tests (critical failures, reliability, bugs, compatibility, service lives and the like), and use under real life conditions (information coming in particular from user-clients, maintenance services and breakdown reports, for example statistical information relating to reliability and to failures of the equipments and components in time, the most frequent failures of equipments as a function of a specific use or a specific fabrication, equipment compatibility, service life and the like).

A detailed example of obtaining information for generating diagnostic tests relating to quality of service (QoS) within an IP VPN is described in the paper by Gérard Delègue et al. "IP VPN Network Diagnosis: Technologies and Perspectives", 3rd International Conference on Networking, March 2002.

The adaptation module MC is responsible for adapting an existing diagnostic model or creating a new diagnostic model as a function of instructions received from the analysis module MA that are representative of one or more actions to be undertaken (generation, modification or reconfiguration).

Each time that the adaptation module MC receives an instruction requiring the generation of a new diagnostic model accompanied by information representative of modification(s) reported by the management system MS, it extracts from the memory M1 one or more reference diagnostic models adapted to the constitution of the network N defined by the accompanying information. It then generates a new diagnostic model, for example by combining the extracted reference diagnostic models, where applicable after adapting (modifying and/or reconfiguring) at least one of them. It then stores this new diagnostic model in the memory M2 so that it can be used by the diagnostic module MD on demand.

Moreover, each time that the adaptation module MC receives an instruction requiring the modification of an existing diagnostic model stored in the memory M2 accompanied by information representative of modification(s) reported by the management system MS, it extracts the existing diagnostic model from the memory M1 and then modifies it as a function of the reported modifications in the network N. Those modifications may necessitate the extraction of one or more reference diagnostic models from the memory M1 in order to integrate it into, or associate it with, the existing diagnostic model, where applicable after adaptation (modification and/or configuration). The adaptation module MC then stores the modified diagnostic model in the memory M2.

For example, if the diagnostic model takes the form of one or more Bayesian networks, modifying it may consist in adding to the Bayesian network and/or eliminating therefrom one or more branches and/or sub-branches and/or one or more nodes each associated with at least one basic test and a selected probability. For example, if the modification of the network N relates to the replacement in a network equipment NE of a single-processor card by a multiprocessor card, the branch used to test the CPU is replaced with a multiple branch.

Figure 2A:
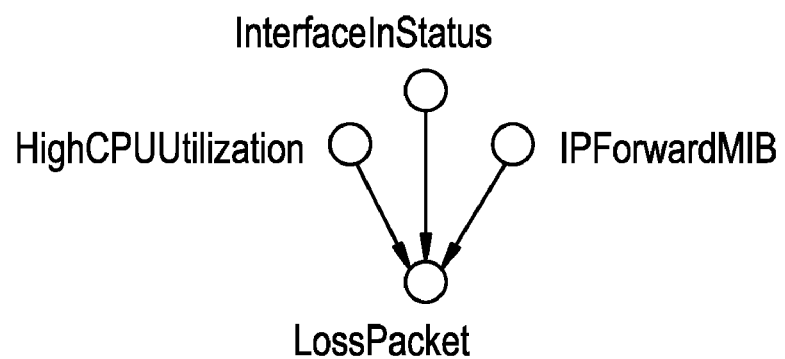
FIGS. 2A to 2C are respectively diagrams of a first example of a Bayesian network adapted to determine the cause of a loss of packets in an IP router, a second example of a Bayesian network resulting from adaptation of the first example shown in FIG. 2A, and a third example of a Bayesian network resulting from adaptation of the second example shown in FIG. 2B.
Figure 2B:
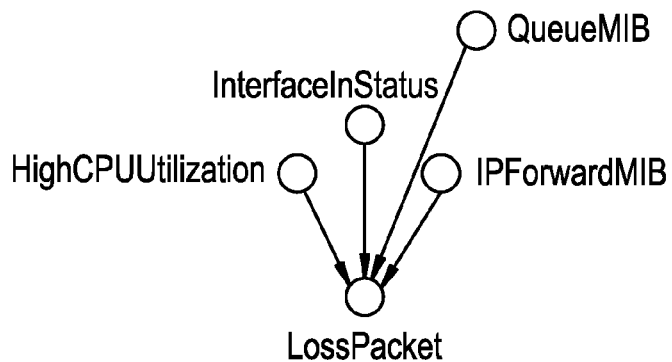
Figure 2C:
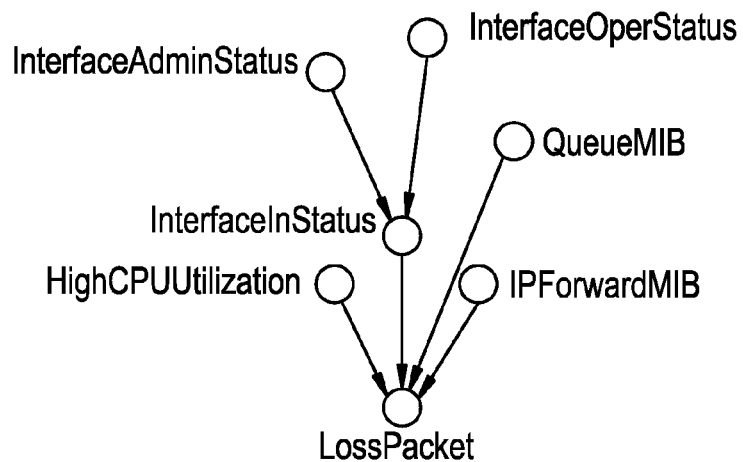

FIGS. 2B and 2C show two examples of successive modifications made to a diagnostic model taking the form of a Bayesian network shown in FIG. 2A.

To be more precise, in the example shown in FIG. 2A the Bayesian network is a scenario for determining the cause of packet loss ("LossPacket") in an IP router of an Internet Protocol virtual private network (IP VPN).

In this Bayesian network:

"InterfaceInStatus" is a variable modeling the status of the input interfaces,

"HighCPUUtilization" is a variable indicating whether the processing capacity (or CPU capacity) of a router is overloaded, and "IPForwardMIB" is a test variable for determining if an LSP has been set up or not.

LossPacket first tests InterfaceInStatus (which is generally the most probable cause. Then, if the status of InterfaceInStatus is "OK", it tests HighCPUUtilization (which is generally the second most probable cause). If the status of HighCPUUtilization is "NOK" (i.e. not OK), LossPacket sends HighCPUUtilization NOK plus the cause of the problem (for example "the capacity of a router is overloaded") and the number of packets lost, if this can be determined. If the status of HighCPUUtilization is OK LossPacket tests IPForwardMIB. If the status of IPForwardMIB is NOK LossPacket sends IPForwardMIB NOK plus the cause of the problem (for example "an LSP has not been set up") and the number of packets lost if this can be determined.

If a new version of software has been installed in the network, a supplementary node must then be added to the FIG. 2A Bayesian network. To take account of this modification of the composition of the network, the adaptation module MC adds a branch including the node "QueueMib" to the FIG. 2A Bayesian network, which yields the modified Bayesian network shown in FIG. 2B.

"QueueMIB" is a variable for verifying if the policy models ("policy-map") are defined in an input interface and an output interface.

If a new interface is installed in the network, a network portion must be added to the FIG. 2B Bayesian network. To take account of this modification of the composition of the network, the adaptation module MC adds two branches respectively including the node "InterfaceOperStatus" and the node "InterfaceAdminStatus" at the level of the InterfaceInStatus node of the FIG. 2B Bayesian network, which yields the modified Bayesian network shown in FIG. 2C.

"InterfaceOperStatus" is a variable of the management information base (MIB) that indicates the current operational status of an interface.

"InterfaceAdminStatus" is another variable of the management information base (MIB) that indicates the required status of an interface.

If the model is produced using the elementary sequence diagram technique, the modification consists in updating a reference sequential scenario by adding simple tests to or eliminating them from existing sequences, for example.

Each time that the adaptation module MC receives an instruction requiring the reconfiguration of an existing diagnostic model stored in the memory M2 accompanied by information representative of modification(s) reported by the management system MS, it extracts the existing diagnostic model from the memory M1 and then reconfigures it as a function of the reported modifications in the network N. The adaptation module MC then stores the reconfigured diagnostic model in the memory M2.

For example, if the diagnostic model takes the form of one or more Bayesian networks, its reconfiguration may consist in updating one or more probabilities (or weightings).

If the diagnostic model is not a Bayesian network, its reconfiguration may consist in modifying one or more administrative costs and/or one or more statistical or probabilistic weights, for example.

The diagnostic device DD of the invention, and in particular its processing module MT and its diagnostic module MD, may be implemented in the form of electronic circuits, software (or data processing) modules or a combination of circuits and software.

The invention is not limited to the embodiments of a diagnostic device and a network or service management system described hereinabove by way of example only, but encompasses all variants thereof that the person skilled in the art might envisage that fall within the scope of the following claims.

There is claimed:

1. A diagnostic device for a communication network including network equipments coupled to a management system, said device including:
diagnostic means adapted to determine the cause of problems occurring in said network by means of one or more diagnostic models and processing means adapted to adapt said diagnostic model as a function of data provided by said management system that is representative of the modification of said network equipment; and
said processing means including analysis means adapted to analyze the data, which is received from said management system, to determine actions to be undertaken to adapt said diagnostic model taking account of the network equipment modification or modifications that they represent and to generate instructions representative of said actions and adaptation means adapted to adapt a diagnostic model as a function of an instruction or instructions received from said analysis means includes adding at least one new node to the communication network.

2. The device claimed in claim 1 wherein said processing means include a first memory coupled to said analysis means and adapted to store one or more reference diagnostic models and said analysis means are adapted to determine each adaptation action to be undertaken by comparing data received to one or more reference diagnostic models stored in said first memory.

3. The device claimed in claim 2, wherein said analysis means are adapted to determine adaptation actions selected from a group including an action representative of a new model to be constructed, an action representative of a modification to be made to an existing diagnostic model, and an action representative of reconfiguration of an existing diagnostic model.

4. The device claimed in claim 3 further comprising a second memory coupled to said processing means and to said diagnostic means and adapted to store each diagnostic model transmitted by said processing means and wherein said adaptation means are adapted, on receiving an instruction requiring the generation of a new diagnostic model because of specific network equipment modifications, to extract from said first memory a reference diagnostic model adapted to the composition of said network taking account of said specific modifications, in order to generate a new diagnostic model and then to store it in said second memory.

5. The device claimed in claim 3 further comprising a second memory coupled to said processing means and to said diagnostic means and adapted to store each diagnostic model transmitted by said processing means and wherein said adaptation means are adapted, on receiving an instruction requiring the modification of an existing diagnostic model stored in said second memory because of specific network equipment modifications, to extract said existing diagnostic model from said second memory in order to modify it as a function of said specific modifications and then to store it when modified in said second memory.

6. The device claimed in claim 3 further comprising a second memory coupled to said processing means and to said diagnostic means and adapted to store each diagnostic model transmitted by said processing means and wherein said adaptation means are adapted, on receiving an instruction requiring the reconfiguration of an existing diagnostic model stored in said second memory because of specific network equipment modifications, to extract said existing diagnostic model from said second memory in order to reconfigure it as a function of said specific modifications and then to store it when reconfigured in said second memory.

7. The device claimed in claim 2 wherein at least some of said reference diagnostic models take the form of one or more Bayesian networks.

8. The device claimed in claim 1 further comprising a memory coupled to said processing means and to said diagnostic means and adapted to store each diagnostic model transmitted by said processing means.

9. The device claimed in claim 8 wherein said diagnostic means are adapted, on receiving a request for a selected diagnosis, to extract said selected diagnosis from said memory and then to execute the extracted diagnostic model in order to deliver a diagnosis at an output.

10. The device claimed in claim 1 wherein said data is transmitted by said management system in the form of notifications.

11. The device claimed in claim 1 wherein at least some of said diagnostic models take the form of one or more Bayesian networks.

12. A management system comprising a managed communication network and one or more diagnostic devices as claimed in claim 1.

13. The management system claimed in claim 12, constituting a network management system.

14. The management system claimed in claim 12, constituting a service management system.

15. The management system of claim 1, wherein said adaptation means adds at least one of (a) a new node and (b) a new Bayesian network structure.

16. A method of determining the cause of problems in a communication network including network equipment coupled to a management system having a computer readable medium configured to store instructions corresponding to steps of the method, said method including:
   determining the cause of problems occurring in said network by means of one or more diagnostic models; and
   adapting said diagnostic model as a function of data provided by said management system that is representative of the modification of said network equipment,
   wherein said adapting includes analyzing the data, which is received from said management system, to determine actions to be undertaken to adapt said one or more diagnostic models, taking account of the network equipment modification or modifications that they represent, and to generate instructions representative of said actions, and
   adapting a diagnostic model as a function of an instruction or instructions generated by the analyzing includes adding at least one new node to the communication network.

17. The method of claim 16, further comprising a memory coupled to said processing means and to said diagnostic means, and adapted to store each diagnostic model transmitted during said adapting.

18. The method claimed in claim 16 wherein said data is transmitted by said management system in the form of notifications.

19. The method of claim 16, wherein said adaptation comprises adding at least one of (a) a new node and (b) a new Bayesian network structure.

* * * * *